United States Patent
Lin et al.

(10) Patent No.: US 7,657,098 B2
(45) Date of Patent: Feb. 2, 2010

(54) METHOD AND APPARATUS FOR REDUCING MOSQUITO NOISE IN DECODED VIDEO SEQUENCE

(75) Inventors: Peng Lin, Irvine, CA (US); Yeong-Taeg Kim, Irvine, CA (US); Seong-Joo Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 811 days.

(21) Appl. No.: 11/121,819

(22) Filed: May 2, 2005

(65) Prior Publication Data

US 2006/0245506 A1 Nov. 2, 2006

(51) Int. Cl.
G06K 9/48 (2006.01)
(52) U.S. Cl. ........................ 382/199; 348/606; 348/607; 348/666; 382/260; 382/266; 382/275
(58) Field of Classification Search ................. 348/606, 348/607, 666; 375/240.2, 240.24, 240.29; 382/199, 260, 261, 264, 266, 275
See application file for complete search history.

(56) References Cited

U.S. PATENT DOCUMENTS

| 5,574,699 | A |   | 11/1996 | Cuomo |  |
|---|---|---|---|---|---|
| 5,610,729 | A |   | 3/1997 | Nakajima |  |
| 5,852,475 | A | * | 12/1998 | Gupta et al. | 348/606 |
| 5,920,356 | A |   | 7/1999 | Gupta |  |
| 6,188,799 | B1 |   | 2/2001 | Tan |  |
| 6,934,057 | B1 | * | 8/2005 | Namizuka | 358/2.1 |
| 7,076,113 | B2 | * | 7/2006 | Le Dinh | 382/261 |
| 7,136,538 | B2 | * | 11/2006 | Kitagawa | 382/275 |
| 7,551,772 | B2 | * | 6/2009 | Lim et al. | 382/162 |
| 2002/0006231 | A1 | * | 1/2002 | Jayant et al. | 382/266 |
| 2006/0245506 | A1 | * | 11/2006 | Lin et al. | 375/240.29 |
| 2008/0085059 | A1 | * | 4/2008 | Chao et al. | 382/260 |
| 2008/0152253 | A1 | * | 6/2008 | Thompson | 382/264 |

FOREIGN PATENT DOCUMENTS

WO    WO 02/102068    12/2002

* cited by examiner

*Primary Examiner*—Gregory M Desire
(74) *Attorney, Agent, or Firm*—Kenneth L. Sherman, Esq.; Michael Zarrabian, Esq.; Myers Andras Sherman LLP

(57) ABSTRACT

A ringing area detector classifies the input image into two regions: a mosquito noise region (i.e. filtering region) and a non-mosquito noise region (i.e. non-filtering region), and uses this classification information to adaptively remove the mosquito noise in a mosquito noise reduction system. The mosquito noise reduction system includes a ringing area detector, a local noise power estimator, a smoothing filter, and a mixer. The ringing area detector includes an edge detector, a near edge detector, a texture detector, and a filtering region decision block. The ringing detection block detects the ringing area where the smoothing filter is to be applied. The local noise power estimator controls the filter strength of the smoothing filter. The smoothing filter smoothes the input image. The mixer mixes the smoothed image and the original image properly based on the region information from the ringing area detection block.

38 Claims, 7 Drawing Sheets

PxQ

METHOD AND APPARATUS FOR REDUCING MOSQUITO NOISE IN DECODED VIDEO SEQUENCE

FIELD OF THE INVENTION

The present invention relates generally to image or video post processing, and more particularly to mosquito noise reduction in decoded video sequence.

BACKGROUND OF THE INVENTION

Many popular image and video compression standards, such as JPEG and MPEG2, are based on Discrete Cosine Transform (DCT) processing. The basic approach of the DCT-based image and video compression technique is to subdivide the image into 8×8 blocks and then individually transform, quantize, and encode each block. In DCT-based compression techniques artifacts may occur, specially at low and moderate bit rates. Among several well-known artifacts, one is typically known as mosquito noise or ringing noise, which mostly appears in image homogeneous regions near strong edges. Mosquito noise is caused by loss of high frequency transform coefficients during the quantization step.

In recent years, several techniques have been proposed for mosquito noise reduction. Generally speaking, there are two types of techniques for mosquito noise reduction. One uses coding parameters to control the filtering process. The other does not rely on the coding information, and is usually called post-processing. The first type techniques require the decoder to send out some coding parameters along with the decoded video sequence, which in many practical situations are impossible. As such, applications for the first type of noise reduction techniques are limited. The second type techniques usually apply some adaptive filtering methods in order to avoid damaging image structures. Among the second type techniques, a technique proposed in the patent application WO 02/102086 uses a segmentation map to guide the filtering process. It classifies the image into five regions and assigns different regions with different filtering weights. FIG. 1 shows a block diagram of the image classifier 100 used in this method. However, classifying the image into five regions and using several cascaded filters, increases hardware complexity and cost.

BRIEF SUMMARY OF THE INVENTION

The present invention addresses the above shortcomings. An object of the present invention is to provide a simple ringing (mosquito noise) region detection method that creates an accurate filtering map to guide the smoothing filter to effectively reduce mosquito noise.

Another object of the present invention is to provide a noise reduction apparatus for effectively reducing mosquito noise in decoded video sequence associated with the ringing region detection.

In one embodiment the present invention provides a ringing area detection method that classifies the input image into two regions: a mosquito noise region (i.e. filtering region) and a non-mosquito noise region (i.e. non-filtering region), and uses this classification information to adaptively remove the mosquito noise. Compared to aforementioned prior art, the present invention provides simpler ways of image segmentation for the purpose of mosquito noise reduction. The present invention further provides a method of avoiding abrupt changes between different regions and possible flicker, by providing soft-switching between filtering region and non-filtering region.

The present invention further provides a mosquito noise reduction system comprising a ringing area detector, a local noise power estimator, a smoothing filter, and a mixer. The ringing area detector includes an edge detector, a near edge detector, a texture detector, and a filtering region decision block. The ringing detection block detects the ringing area where the smoothing filter is to be applied. The local noise power estimator controls the filter strength of the smoothing filter. The smoothing filter smoothes the input image. The mixer mixes the smoothed image and the original image properly based on the region information from the ringing area detection block.

Other features and advantages of the present invention will be apparent from the following specifications taken in conjunction with the following drawings.

BRIEF DESCRIPTION OF THE DRAWINGS

FIG. 3 shows an example diagram of an image divided into non-overlapped P×Q blocks.

In the drawings, like reference numbers refer to similar elements.

DETAILED DESCRIPTION OF THE INVENTION

Figure 1:
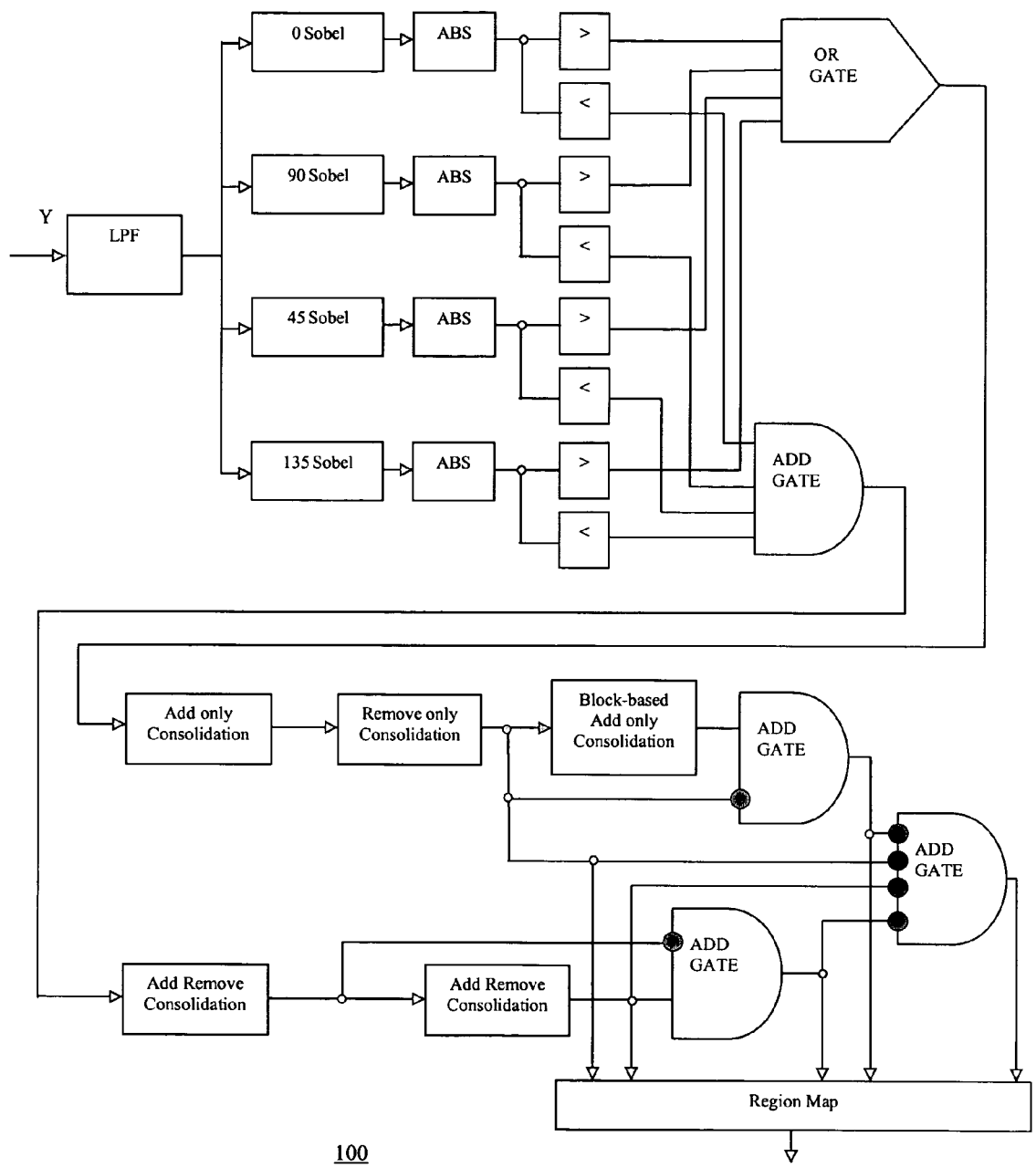
FIG. 1 shows a block diagram of an image region classification system used for a mosquito noise reduction system in prior art.
Figure 2:
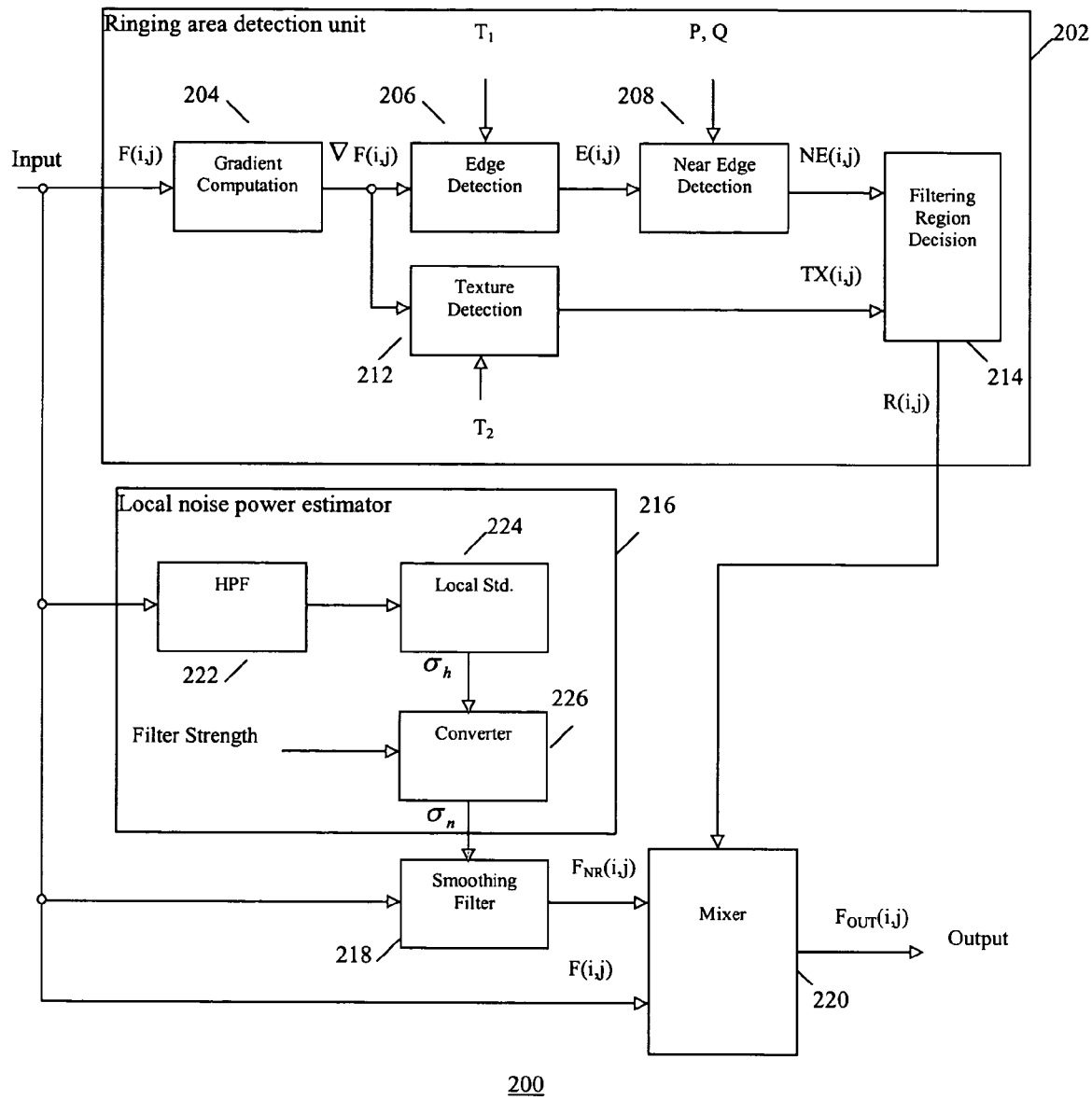
FIG. 2 shows an example block diagram of an embodiment of a mosquito noise reduction system according to the present invention.

FIG. 2 shows an example block diagram of a mosquito noise reduction system 200 according to an embodiment of the present invention. The mosquito noise reduction system 200 comprises a ringing area detection unit 202 including a gradient computation unit 204, an edge detection unit 206, a near edge decision unit 208, a texture detection unit 210, and a filtering region decision unit 212. The mosquito noise reduction system 200 further comprises a local noise power estimator 216, a smoothing filter 218, and a mixer 220. The local noise power estimator 216 includes a high pass filter (HPF) 222, a local standard deviation calculation unit 224 and a converter 226. The function of the ringing area detection unit 202 is to detect the ringing region (or mosquito noise region) where the smoothing filter 218 needs to be applied.

The mosquito noise reduction system 200 can be applied to both the luminance signal Y and the chrominance signals U and V in a video signal. As such, in general, the input signal is denoted by F(i,j), where i and j are the indices for image row and column respectively. Referring to FIG. 2, the gradient computation unit 204 computes the gradient of the input signal F(i,j), generating the gradient |∇F(i,j)|. Those skilled in the art will recognize that different numerical methods can be used to calculate the gradient ∇F(i,j) for a given image.

Using the gradient ∇F(i,j), edges and texture information are then examined. The edge detection unit 206 detects an edge by comparing the magnitude of the gradient, |∇F(i,j)|, with a threshold value $T_1$ as:

$$E(i, j) = \begin{cases} 1, & \text{if } |\nabla F(i, j)| > T_1 \\ 0, & \text{else} \end{cases}$$

where 1 denotes edge, and 0 denotes non-edge, and $T_1$ is a predetermined constant.

Because the ringing artifacts in compressed video arises near edges, it is necessary to detect whether a current pixel is near an edges or not. For this purpose, the near edge detection unit 208 checks whether there are edges in the neighborhood of the current pixel. Specifically, considering a P×Q image pixel block and counting the edge samples in this block, if the block contains more than a certain number of edges, it is assumed that the current pixel is located near edges. Accordingly, let $N_e^{P \times Q}(i,j)$ denote the number of edge samples in the P×Q block around the current pixel (i,j), then the near edge detection NE(i,j) is computed as:

$$NE(i, j) = \begin{cases} 1, & \text{if } N_e^{P \times Q}(i, j) > N_T \\ 0, & \text{else} \end{cases}$$

where 1 denotes near-edge pixel and 0 denotes non-near-edge pixel, where $N_T$ is a predetermined constant.

Figure 3:
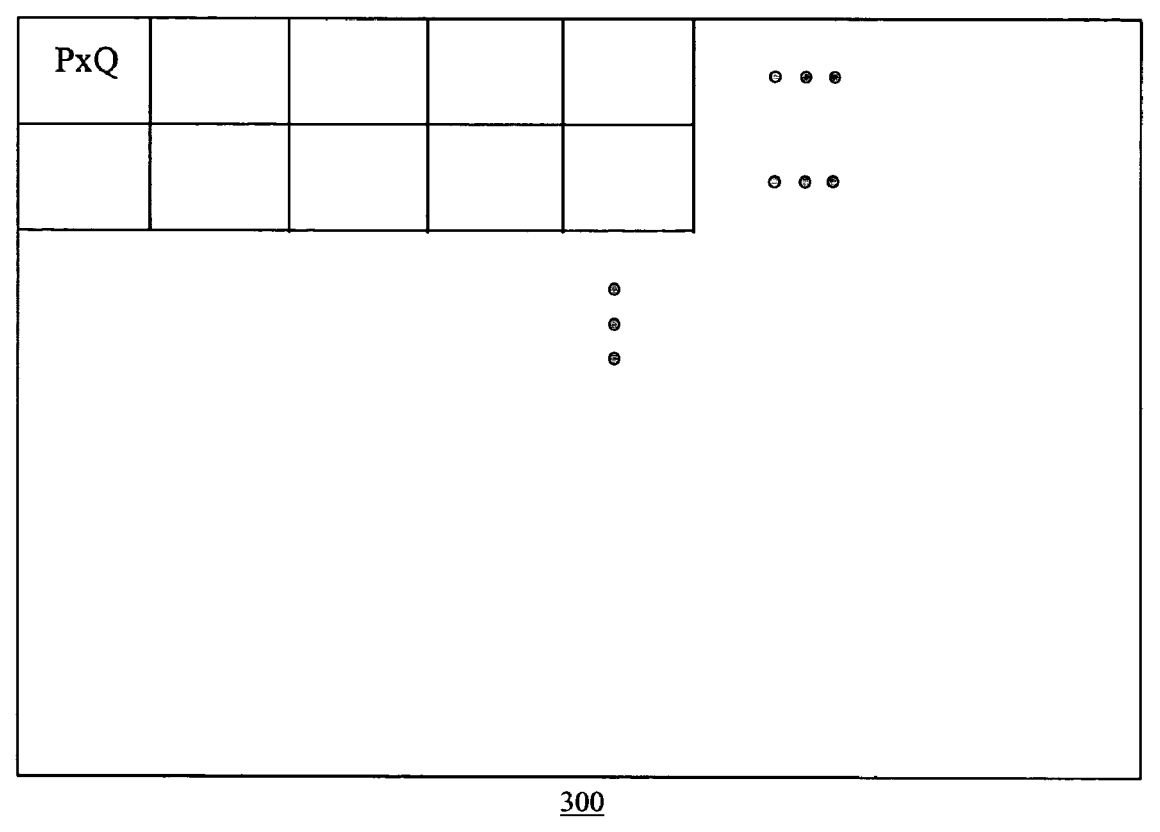

For simplification, the present invention also proposes to use non-overlapped blocks for near edge detection. (Note that the block for computing $N_e^{P \times Q}(i,j)$ assume overlapped blocks or sliding blocks as pixels are processed.) That is, as shown by example in FIG. 3, the image 300 is divided into multiple P×Q blocks, and then the near-edge block NEB (I, J) is detected as:

$$NEB(I, J) = \begin{cases} 1, & \text{if } N_e^{P \times Q}(I, J) > N_T \\ 0, & \text{else} \end{cases}$$

where $N_e^{P \times Q}(I,J)$ represents the number of edge samples of the (I,J)th block in which $I = \lfloor i/P \rfloor$, $J = \lfloor j/Q \rfloor$, and $\lfloor x \rfloor$ is the floor function which returns to the integer part of the nonnegative number x. Further, NEB(I,J)=1 implies that the (I,J)th block is a near-edge block. Then, the near edge detection for the current pixel F(i,j) is set as:

NE(i,j)=NEB(I,J).

Note that with the use of non-overlapped block, the pixels that belong to the (I,J)th block have the same near-edge information. This significantly reduces computation complexity when computing near-edge detection compared to the overlapped block based detection where it is assumed that near edge detection needs to be performed for every pixel position repeatedly.

Referring back to FIG. 2, the texture detection unit 212 detects the texture TX(i, j) by comparing |∇F(i,j)| with another threshold value $T_2$, as:

$$TX(i, j) = \begin{cases} 1, & \text{if } |\nabla F(i, j)| > T_2 \\ 0, & \text{else} \end{cases}$$

where 1 denotes texture, 0 denotes non-texture and $T_2$ is a predetermined constant which is less than $T_1$.

The filtering region decision unit 214 generates the filtering region map R(i,j) based on the supplied near-edge map NE(i,j) and the texture map TX(i,j). The near-edge map actually already marks the image region where the mosquito noise occurs. However, the near-edge map may also contain some texture and filtering texture will cause blurring. Therefore, in order to obtain an accurate filtering region map, texture needs to be eliminated from the edge-block map. The logic for removing the texture from the near-edge map is:

$$R(i, j) = \begin{cases} 1, & \text{if } NE(i, j) = 1 \text{ and } TX(i, j) = 0, \\ 0, & \text{otherwise;} \end{cases}$$

where 1 denotes the filtering region where ringing artifact occurs and 0 denotes the non-filtering region.

Since the near edge decision unit needs P lines of image data to generate the near-edge map, line memory delay may happen at the filtering region decision unit 214. The filtering region map generated by the filtering region decision unit 214 is then supplied to the mixer 220.

The purpose of the local noise power estimator 216 in FIG. 2 is to provide the local filter strength $\sigma_n$ to be used by the smoothing filter 218. The HPF 222 extracts mainly the noise component of the input signal. In a preferred embodiment, the following HPF is used:

$$\begin{bmatrix} 1 & -2 & 1 \\ -2 & 4 & -2 \\ 1 & -2 & 1 \end{bmatrix}.$$

The local standard calculator 224 calculates the local standard deviation $\sigma_h$ of the high-pass filtered signal HF(i,j) over a r×s window in the video image as:

$$\sigma_h(i, j) = \frac{1}{r \times s} \sum_{n=-r}^{r} \sum_{m=-s}^{s} |HF(i+m, j+n) - \mu_h(i, j)|,$$

where $$\mu_h(i, j) = \frac{1}{r \times s} \sum_{n=-r}^{r} \sum_{m=-s}^{s} HF(i+m, j+n).$$

The calculated local standard deviation $\sigma_h$ is forwarded to the converter 226 which converts the local ringing noise power $\sigma_h$ to the equivalent local additive Gaussian noise power $\sigma_n$. The converter 226 implements the following relation:

$$\sigma_n = B \sigma_h^{0.45},$$

where B is a user controlled global filter strength parameter which controls the overall smoothing level of the smoothing filter. The estimated local noise power $\sigma_n$ is supplied to the smoothing filter 218.

The smoothing filter 218 comprises an edge preserving filter which removes noise while retaining image edges. The output $F_{NR}(i,j)$ of the smoothing 218 filter is supplied to the mixer 220. There are many examples of edge preserving filters that can be used as the smoothing filter 218 in the mosquito noise reduction system 200 according to the present invention. One example smoothing filter is the weighted sigma filter, which is defined as:

$$F_{NR}(i, j) = \frac{1}{N} \sum_{n=-r}^{r} \sum_{m=-r}^{r} w_{m,n} \cdot F(i+m, j+n);$$

wherein, $$w_{m,n} = \begin{cases} 2 & \text{if } |F(i+m, j+n) - F(i, j)| < C_1 \sigma_n, \\ 1 & \text{if } |F(i+m, j+n) - F(i, j)| < C_2 \sigma_n, \\ 0 & \text{otherwise}; \end{cases}$$

$$N = \sum_{n=-r}^{r} \sum_{m=-r}^{r} w_{m,n};$$

and $C_1$, $C_2$ are predetermined constants with $0 < C_1 < C_2$, and $\sigma_n$ is the local noise power.

Another example smoothing filter is the minimal mean square error (MMSE) filter. The MMSE filter is defined as:

$$F_{NR}(i, j) = \mu(i, j) + \frac{\max(\sigma^2(i, j) - \sigma_n^2, 0)}{\max(\sigma^2(i, j) - \sigma_n^2, 0) + \sigma_n^2} \cdot [F(i, j) - \mu(i, j)],$$

wherein $\sigma_n$ is the local noise power, and, $\mu(i,j)$ and $\sigma(i,j)$ are the local mean and local standard deviation computed over a $r \times r$ window as:

$$\mu(i, j) = \frac{1}{r^2} \sum_{n=-r}^{r} \sum_{m=-s}^{s} F(i+m, j+n),$$

$$\sigma(i, j) = \frac{1}{r^2} \sum_{n=-r}^{r} \sum_{m=-s}^{s} |F(i+m, j+n) - \mu(i, j)|.$$

The mixer 220 in FIG. 2 selects either the output $F_{NR}(i,j)$ of the smoothing filter 218 or the original input signal $F(i,j)$ as the final output based on the filtering region map, separating the image into two regions: filtering region and non-filtering region. In the filtering region, the output $F_{NR}(i,j)$ of the smoothing filter 218 is selected as the final output. In the non-filtering region, the original input signal $F(i,j)$ is selected as the final output.

Figure 4:
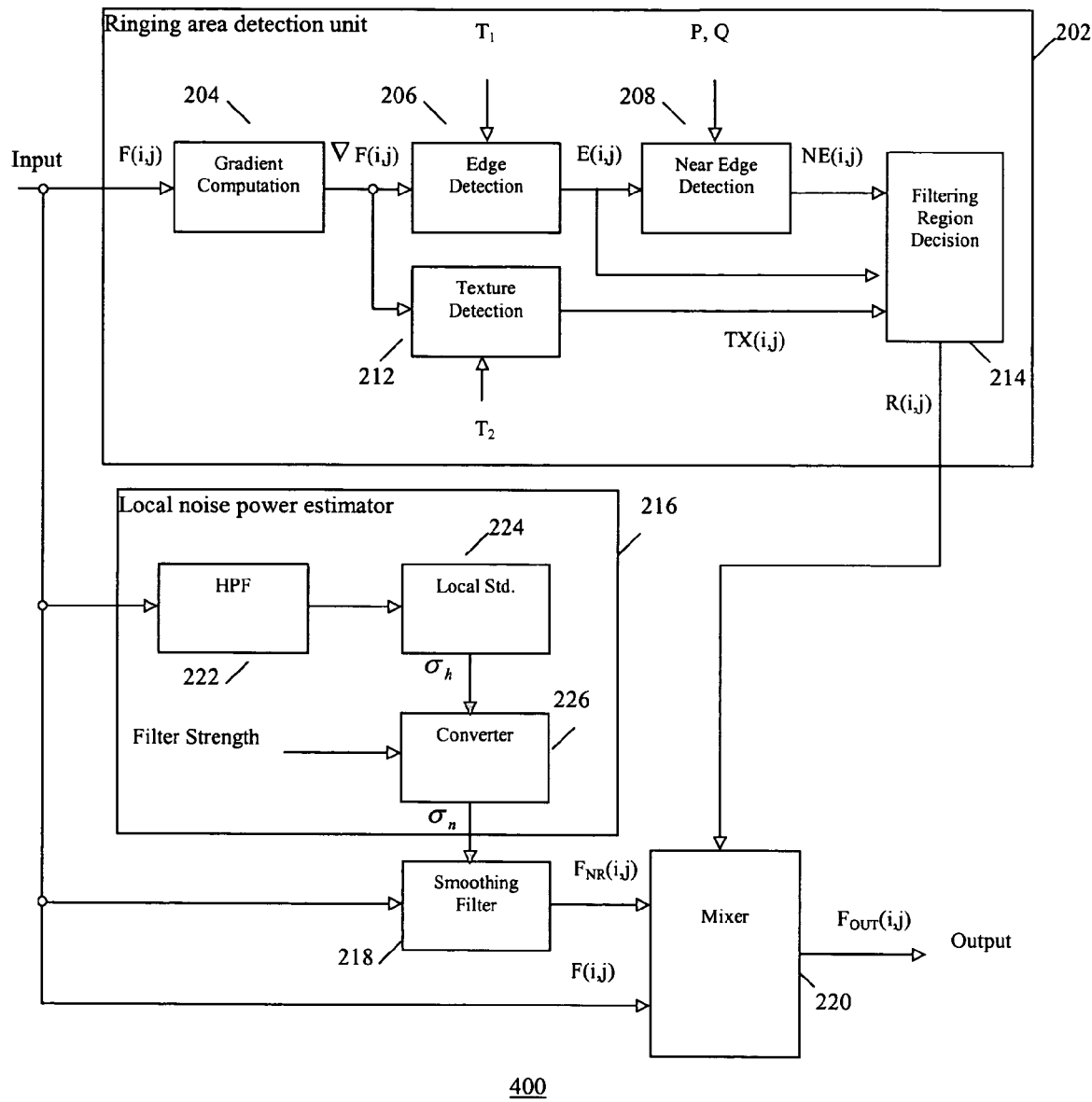
FIG. 4 shows an example block diagram of a variation of the mosquito noise reduction system shown in FIG. 2 according to the present invention, which also uses edge map for filtering region decision.

There are many example variations of the mosquito noise reduction system 200 shown in FIG. 2, according to embodiments of the present invention. FIG. 4 shows a block diagram of a system 400 which is a variation of the mosquito noise reduction system 200 shown in FIG. 2, wherein the system 400 additionally uses the edge map for filtering region decision. In this case, edges are included in the filtering region map. With the supplied edge map $E(i,j)$, the filtering region decision unit 214 in the system 400 generates the filtering region map as:

$$R(i, j) = \begin{cases} 1 & \text{if } (NE(i, j) = 1 \text{ and } TX(i, j) = 0) \text{ or } (E(i, j) = 1), \\ 0 & \text{otherwise}; \end{cases}$$

where 1 denotes the filtering region and 0 denotes the non-filtering region.

Figure 5:
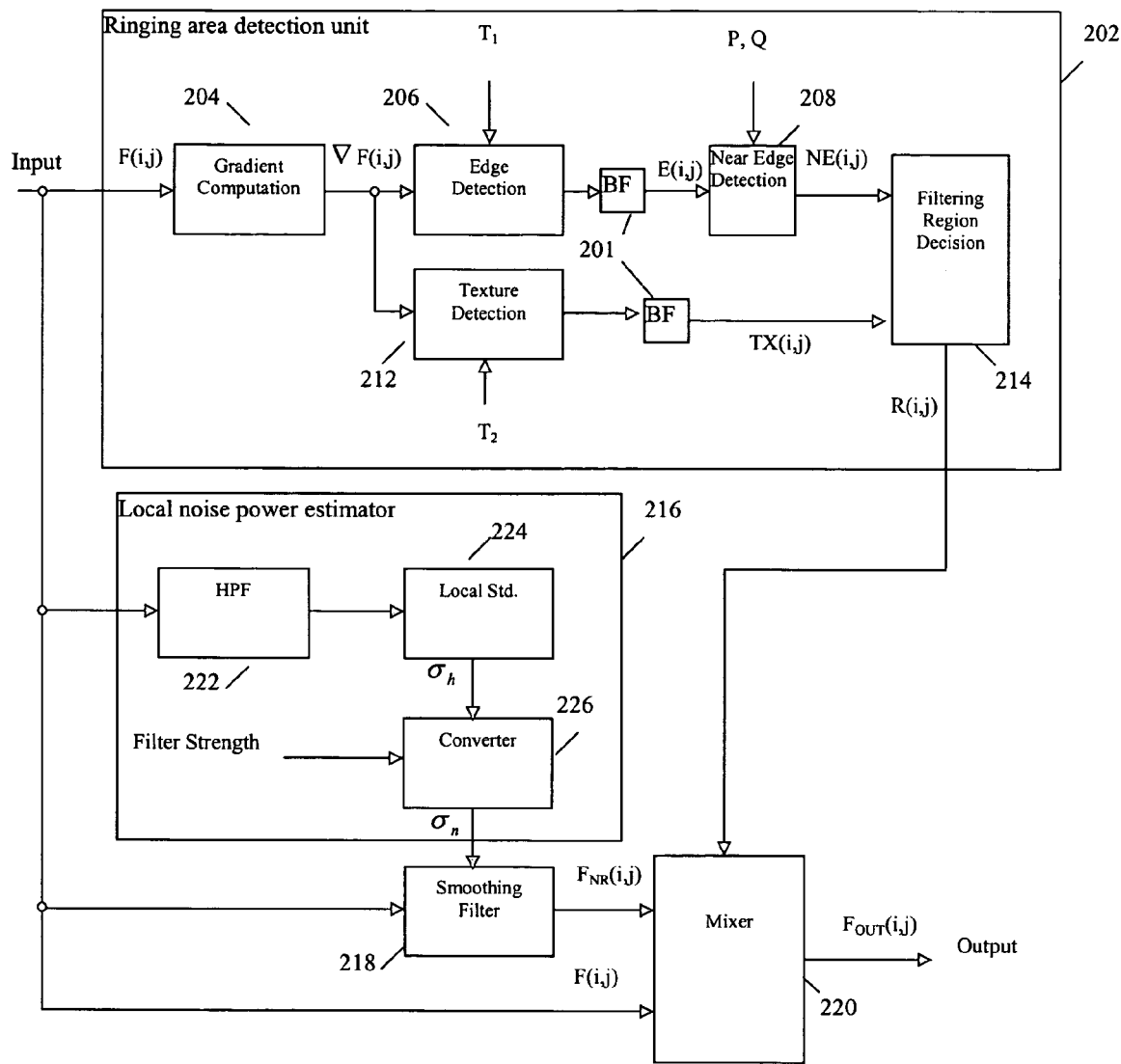
FIG. 5 shows an example block diagram of another variation of the mosquito noise reduction system shown in FIG. 2 according to the present invention, which uses binary filters to filter the edge map and the texture map.

FIG. 5 shows a block diagram of an example system 500 which is yet another variation of the mosquito noise reduction system 200 shown in FIG. 2, that additionally uses binary filters (BF) 201 to filter the edge map and the texture map. The purpose of using the binary filters 201 in the system 500 is to remove the small holes in the edge map and the texture map. Preferably, the type of binary filters 201 used is the mathematical morphology closing operator. If $g(i,j)$ is a binary function, then the closing operator $C_w(\cdot)$ is defined as:

$$C_w(g)(i,j) = \min_w(\max_w(g(i,j))),$$

wherein W is a window centered at the pixel $(i,j)$, and $\min_w(\cdot)$ and $\max_w(\cdot)$ are the functions that return the minimal and maximal values within the window W, respectively. Preferably, the window W used for the closing operator is a $5 \times 5$ window.

Figure 6:
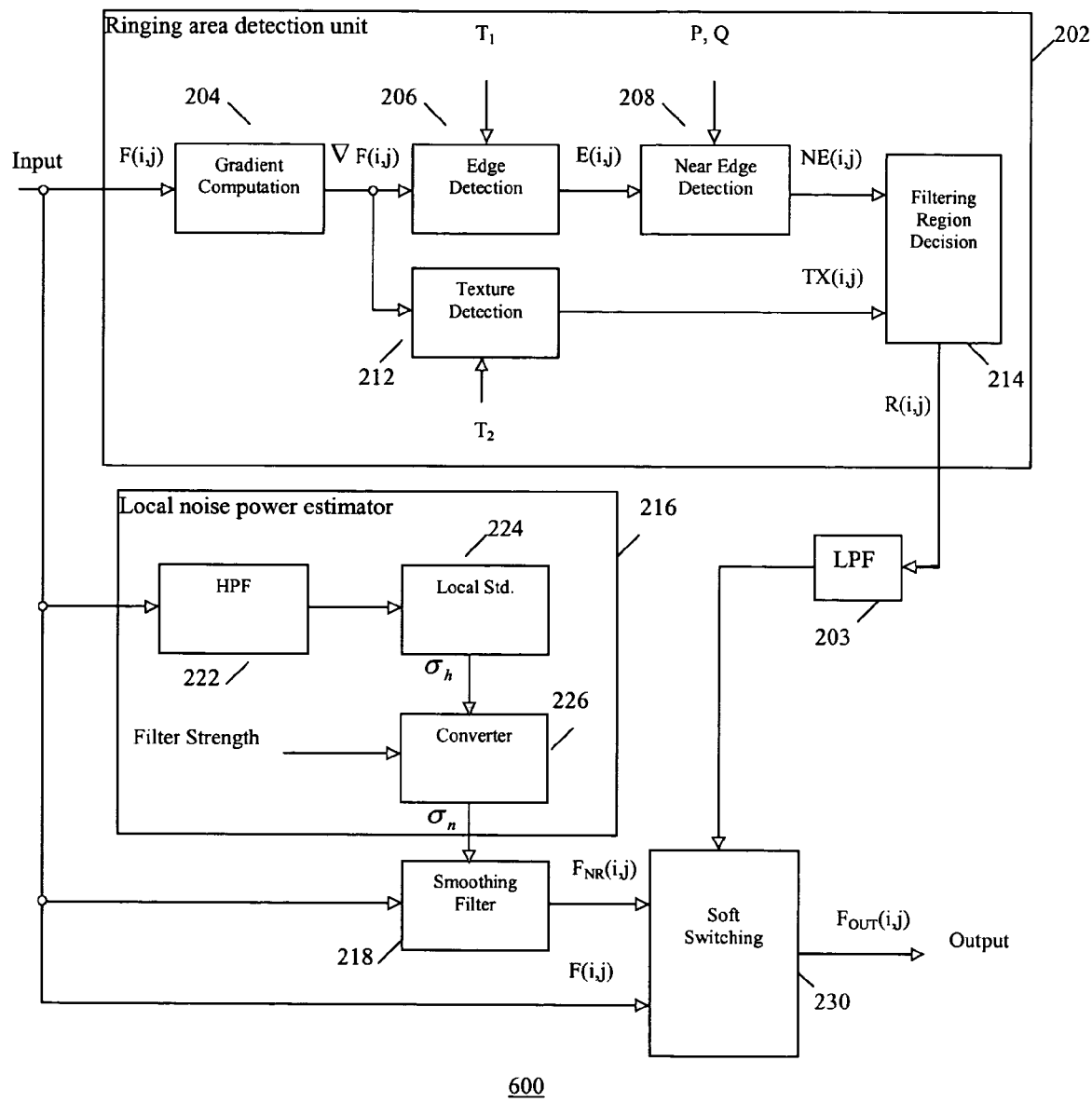
FIG. 6 shows an example block diagram of another variation of the mosquito noise reduction system shown in FIG. 2 according to the present invention, which uses soft switching to control the smoothing filter.

FIG. 6 shows a block diagram of an example system 600 which is yet another variation of the mosquito noise reduction system 200 shown in FIG. 2, wherein the system 600 uses a soft switching unit 230 to control the smoothing filter 218 of the system 600. In the system 600, the filtering region map $R(i,j)$ first passes through a low-pass filter 203 to generate a smoothed version of the filtering region map $\tilde{R}(i,j)$. The function of the low-pass filter 203 is to create a smooth transition between the filtering region and the non-filtering region. With this smoothed region map, hard switching can be replaced by soft switching. Therefore, abrupt changes between the filtered region and the non-filtered region in the processed image can be avoided using the system 600.

In FIG. 6, the soft switching unit 230 uses the smoothed filtering region map $\tilde{R}(i,j)$ to control the switching between the result of the smoothing filter $F_{NR}(i,j)$, and the original signal $F(i,j)$. The basic idea is to use the filter result $F_{NR}(i,j)$ in the filtering region (i.e., mosquito noise region) and gradually switching to the original signal when getting into the non-filtering region (i.e., non mosquito noise region). The soft switching unit 230 determines the final output of the system-$F_{OUT}(i,j)$ as:

$$F_{OUT}(i,j) = \tilde{R}(i,j) \cdot F_{NR}(i,j) + (1 - \tilde{R}(i,j)) \cdot F(i,j).$$

Figure 7:
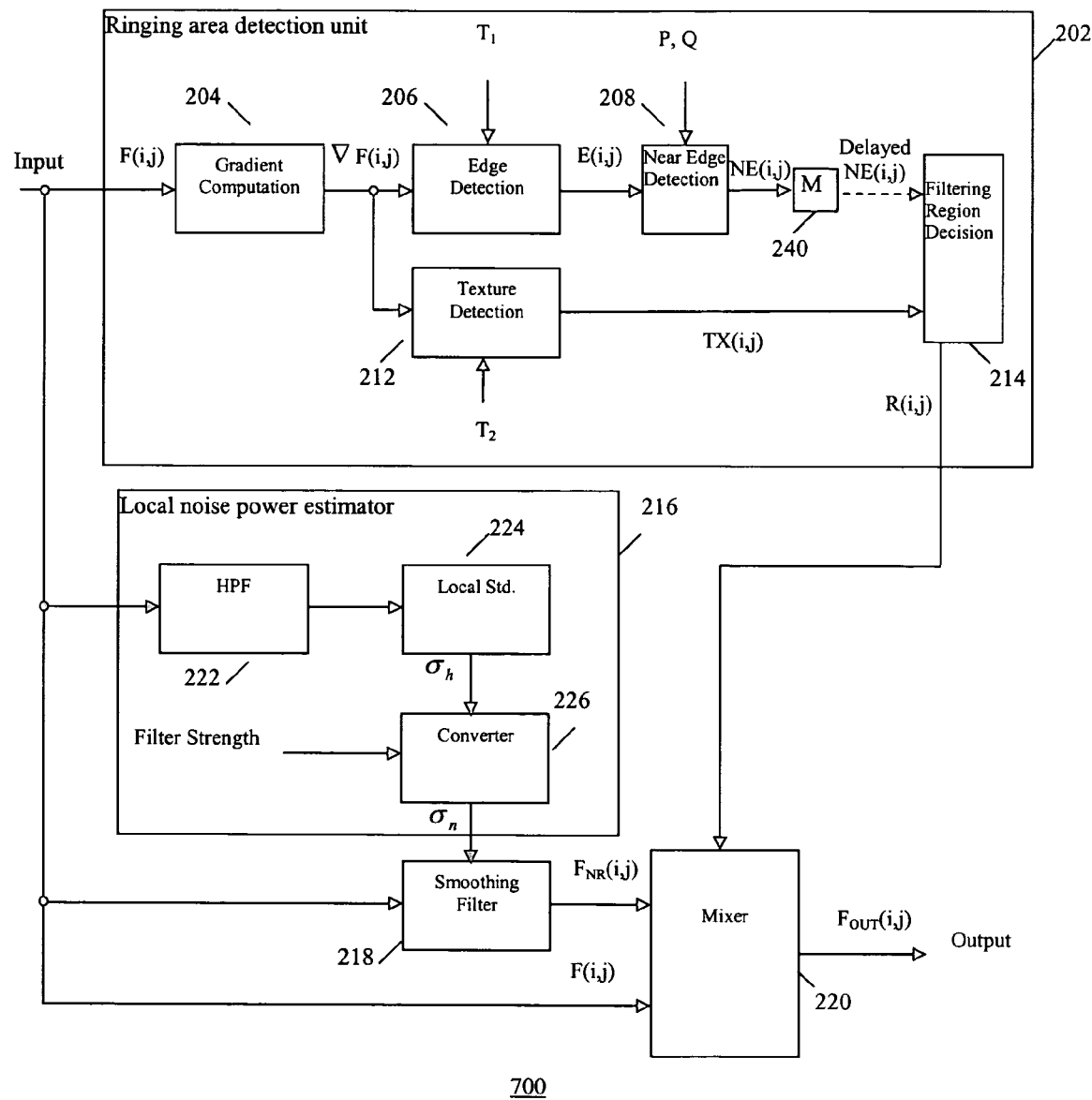
FIG. 7 shows an example block diagram of another variation of the mosquito noise reduction system shown in FIG. 2 according to the present invention, which uses a delayed edge-block map stored in memory to reduce the hardware complexity.

Since the near edge decision unit map in a mosquito noise reduction system according to the present invention needs P lines of image data to generate the near-edge map, for line memory constrained hardware implementation, system delay may happen. Accordingly, referring to FIG. 7, a mosquito noise reduction system 700 using delayed near-edge map is provided to reduce the hardware complexity. The system 700 is yet another variation of the mosquito noise reduction system 200 shown in FIG. 2, wherein system 700 in FIG. 7 uses a delayed near-edge map stored in a memory unit (M) 240 to reduce the hardware complexity. In this case, the filtering region decision unit uses the delayed near-edge map, which is generated from previous frame and is stored in the memory unit 240, and the texture map of the current frame to generate the filtering region map. Further, the near-edge map of the current frame is passed to the memory unit 240 instead of the filtering region decision unit 214. The other components of the system 700 are similar to those of the system 200 shown in FIG. 2.

The present invention has been described in considerable detail with reference to certain preferred versions thereof; however, other versions are possible. Therefore, the spirit and scope of the appended claims should not be limited to the description of the preferred versions contained herein.

What is claimed is:

1. An apparatus for detecting ringing area in a decoded video sequence, comprising:
   a gradient computation unit that calculates a gradient of the video image;
   an edge detector that detects an edge region in the video image and generates an edge map, the edge detector using a magnitude of the gradient to determine if a pixel is an edge pixel;
   a near edge detector that uses the edge map to detect near-edge region and generates a near-edge map;
   a texture detector that detects texture in the video image and generates a texture map; and
   a filtering region decision unit that uses the near-edge map and the texture map to generate a filtering region map.

2. The apparatus of claim 1, wherein the edge detection unit detects the edge region by comparing the magnitude of the gradient of each pixel in the video image with a threshold value, and marks the pixel as an edge pixel if its gradient is greater than the threshold value.

3. The apparatus of claim 1, wherein the near edge detector detects the near-edge region by counting the edge pixels within a block in the video image, wherein the block contains the current pixel, and marks the current pixel as a near-edge pixel if the number of edge pixels within the block exceeds certain threshold value.

4. The apparatus of claim 3, wherein said block used for near-edge detection overlaps other blocks in the video image.

5. The apparatus of claim 3, wherein said block used for near-edge detection is non-overlapping with other blocks in the video image.

6. The apparatus of claim 1, wherein the texture detection unit detects the texture region by comparing the magnitude of the gradient of each pixel in the video image with a threshold value, and marks the pixel as a texture pixel if its gradient is greater than the threshold value.

7. The apparatus of claim 1, wherein said filtering region decision unit generates the filtering region map by excluding the texture region from the near-edge region.

8. A noise reduction system for reducing mosquito noise in a decoded video sequence, comprising:
   a ringing area detection unit apparatus as claimed in claim 1 that generates a filtering region map for the video image;
   a local noise power estimator that estimates an equivalent local additive Gaussian noise power from the video image;
   a smoothing filter that removes unwanted noise from the video image based on said estimate; and
   a mixer that selects either the result of the smoothing filter or the original input video image as output based on the filtering region map.

9. The system of claim 8, wherein said local noise power estimator comprises:
   a high-pass filter that extracts the noise component of the video image signal $F(i,j)$;
   a local standard deviation calculator that calculates the local standard deviation $\sigma_h$ of the high-pass filtered signal; and
   a converter that converts the local standard deviation $\sigma_h$ of the high-pass filtered signal into a equivalent local additive Gaussian noise power $\sigma_n$ as said estimate.

10. The system of claim 9, wherein said local standard deviation calculator calculates the local standard deviation $\sigma_h$ of the high-pass filtered signal $HF(i,j)$ over a r×s window in the video image as:

$$\sigma_h(i,j) = \frac{1}{r \times s} \sum_{n=-r}^{r} \sum_{m=-s}^{s} |HF(i+m, j+n) - \mu_h(i,j)|$$

wherein $$\mu_h(i,j) = \frac{1}{r \times s} \sum_{n=-r}^{r} \sum_{m=-s}^{s} HF(i+m, j+n).$$

11. The system of claim 9, wherein said converter converts the local standard deviation $\sigma_h$ of the high-pass filtered signal into a equivalent local additive Gaussian noise power $\sigma_n$ as:

$$\sigma_n = B\sigma_h^{0.45},$$

wherein B is global filter strength parameter which controls the overall smoothing level of the smoothing filter.

12. The system of claim 8, wherein said smoothing filter comprises a weighted sigma filter that filters the input signal as:

$$F_{NR}(i,j) = \frac{1}{N} \sum_{n=-r}^{r} \sum_{m=-r}^{r} w_{m,n} \cdot F(i+m, j+n),$$

wherein $F_{NR}(i,j)$ is the filtered signal;

$$w_{m,n} = \begin{cases} 2 & \text{if } |F(i+m, j+n) - F(i,j)| < C_1\sigma_n, \\ 1 & \text{if } |F(i+m, j+n) - F(i,j)| < C_2\sigma_n, \\ 0 & \text{otherwise;} \end{cases}$$

$$N = \sum_{n=-r}^{r} \sum_{m=-r}^{r} w_{m,n},$$

and $C_1$, $C_2$ are predetermined constants with $0 < C_1 < C_2$, and $\sigma_n$ is the local noise power.

13. The system of claim 8, wherein said noise smoothing filter comprises a minimal mean square error filter that filters the signal as:

$$F_{NR}(i,j) = \mu(i,j) + \frac{\max(\sigma^2(i,j) - \sigma_n^2, 0)}{\max(\sigma^2(i,j) - \sigma_n^2, 0) + \sigma_n^2} \cdot [F(i,j) - \mu(i,j)],$$

wherein $F_{NR}(i,j)$ is the filtered signal;

$$\mu(i,j) = \frac{1}{r^2} \sum_{n=-r}^{r} \sum_{m=-r}^{r} F(i+m, j+n),$$

$$\sigma(i,j) = \frac{1}{r^2} \sum_{n=-r}^{r} \sum_{m=-r}^{r} |F(i+m, j+n) - \mu(i,j)|,$$

and $\sigma_n$ is the local noise power.

14. The system of claim 8, wherein said mixer selects the result of the smoothing filter as the output in the filtering region, and selects the original input signal as the output in the non-filtering region.

15. A noise reduction system for reducing mosquito noise in decoded video image sequence, comprising:
- a ringing area detection apparatus as claimed in claim 1 that generates a filtering region map for a video image;
- a low-pass filter that smoothes the filtering region map to generate a smooth transition between a filtering region and a non-filtering region;
- a local noise power estimator that estimates the equivalent local additive Gaussian noise power from the video image;
- a smoothing filter that removes unwanted noise from the video image; and
- a soft switching unit that gradually switches the smoothing filter on and off based on the smoothed filtering region map.

16. The system of claim 15, wherein said soft switching unit determines the output $F_{OUT}(i,j)$ of the system as:

$$F_{OUT}(i,j) = \tilde{R}(i,j) \cdot F_{NR}(i,j) + (1 - \tilde{R}(i,j)) \cdot F(i,j),$$

wherein $\tilde{R}(i,j)$ is the smoothed filtering region map, $F_{NR}(i,j)$ is the output of the smoothing filter, and $F(i,j)$ is the original input video image.

17. An apparatus for detecting a ringing area in a decoded video sequence, comprising:
- a gradient computation unit that calculates a gradient of the video image;
- an edge detector that detects an edge region in the video image and generates an edge-map, the edge detector using a magnitude of the gradient to determine if a pixel is an edge pixel;
- a near edge detector that uses the edge map to detect near-edge region and generates a near-edge map;
- a texture detector that detects texture in the video image and generates a texture map; and
- a filtering region decision unit that generates a filtering region map based on the near-edge map, the texture map, and the edge map.

18. The apparatus of claim 17, wherein said filtering region decision unit generates the filtering region map by excluding the texture region from the near-edge region but keeping the edge region in the near-edge region.

19. An apparatus for detecting ringing area in a decoded video sequence, comprising:
- a gradient computation unit that calculates a gradient of the video image;
- an edge detector that detects an edge region in the video image and generates an edge-map, the edge detector using a magnitude of the gradient to determine if a pixel is an edge pixel;
- a first binary filter for filtering the edge-map;
- a near edge detector that uses the edge map to detect near-edge region and generates a near-edge map;
- a texture detector that detects texture in the video image and generates a texture map; and
- a second binary filter for filtering the texture map; and
- a filtering region decision unit that generates a filtering region map based on the filtered near-edge map and the filtered texture map.

20. The apparatus as claimed in claim 19, wherein the first binary filter comprises a mathematical morphology closing operator, and the second binary filter comprises another mathematical morphology closing operator.

21. An apparatus for detecting ringing area in a sequence of decoded video frames, comprising:
- a texture detector that detects texture in a current video frame and generates a texture map;
- a gradient computation unit that calculates a gradient of the video image;
- an edge detector that detects an edge region in the current video frame and generates an edge map, the edge detector using a magnitude of the gradient to determine if a pixel is an edge pixel;
- a near edge detector that uses the edge map to detect near-edge region in the current video frame and generates a near-edge map;
- a memory unit that stores the near-edge map of the previous video frame; and
- a filtering region decision unit that generates a filtering region map based on the delayed near-edge map of a previous frame and the texture map of the current frame.

22. A method of detecting a ringing area in a video image indicating mosquito noise therein, comprising:
- employing a noise reduction processor for:
  - performing a gradient computation to determine the magnitude of a gradient in the video image;
  - classifying the input image into a mosquito noise filtering region and a non-mosquito noise region using the gradient computation; and
  - using the classification information to adaptively remove the mosquito noise from the video image.

23. The method of claim 22, wherein the step of classifying further includes the steps of detecting a ringing area in the video image by:
- detecting edge regions in the video image and generating an edge map;
- detecting near-edge regions in the video image using the edge map, and generating a near-edge map;
- detecting texture in the video image and generating a texture map; and
- generating a filtering region map representing a mosquito noise filtering region, based on the near-edge map and the texture map.

24. The method of claim 23, before the step of detecting an edge region, such that the step of edge detection further includes comparing the gradient of each pixel in the video image with a threshold value and marking the pixel as an edge pixel if its gradient is greater than the threshold value.

25. The method of claim 23 wherein the steps of detecting near-edge regions further includes the steps of counting the edge pixels within a block in the video image, wherein the block contains the current pixel, and marking the current pixel as a near-edge pixel if the number of edge pixels within the block exceeds certain threshold value.

26. The method of claim 25 wherein said block overlaps other blocks used for near-edge detection in the video image.

27. The method of claim 25 wherein said block is non-overlapping with other blocks used for near-edge detection in the video image.

28. The method of claim 23, before the step of detecting texture, wherein the step of detecting texture further includes the steps of detecting a texture region by comparing the gradient of each pixel in the video image with a threshold value, and marking the pixel as a texture pixel if its gradient is greater than the threshold value.

29. The method of claim 23 wherein the step of generating a filtering region map further includes the steps of excluding the texture region from the near-edge region.

30. A method of reducing mosquito noise in a digital video image, comprising:
- employing a noise reduction processor for:
  - performing a gradient computation to determine the magnitude of a gradient in the video image;

classifying the input image into a mosquito noise filtering region and a non-mosquito noise region using the gradient computation;
using the classification information to adaptively remove the mosquito noise from the video image;
generating a filtering region map for the video image;
determining a local noise power estimator that estimates an equivalent local additive Gaussian noise power from the video image;
using a smoothing filter to remove noise from the video image based on said estimate; and
selects either the result of the smoothing filter or the original input video image as output based on the filtering region map.

31. The method of claim 30, wherein the step of determining the local noise power estimate further includes the steps of:
using a high-pass filter to extract the noise component of the video image signal pixels F(i,j);
calculating a local standard deviation $\sigma_h$ of the high-pass filtered signal; and
converting the local standard deviation $\sigma_h$ of the high-pass filtered signal into a equivalent local additive Gaussian noise power $\sigma_n$ as said estimate.

32. The method of claim 31, wherein the step of local standard deviation calculation further includes the steps of calculating the local standard deviation $\sigma_h$ of the high-pass filtered signal HF(i,j) over a r×s window in the video image as:

$$\sigma_h(i, j) = \frac{1}{r \times s} \sum_{n=-r}^{r} \sum_{m=-s}^{s} |HF(i+m, j+n) - \mu_h(i, j)|$$

wherein $$\mu_h(i, j) = \frac{1}{r \times s} \sum_{n=-r}^{r} \sum_{m=-s}^{s} HF(i+m, j+n).$$

33. The method of claim 31, wherein the step of converting further includes the steps of converting the local standard deviation $\sigma_h$ of the high-pass filtered signal into a equivalent local additive Gaussian noise power $\sigma_n$ as:

$\sigma_n = B\sigma_h^{0.45}$, wherein B is global filter strength parameter which controls the overall smoothing level of the smoothing filter.

34. The method of claim 30, wherein said smoothing filter comprises a weighted sigma filter that filters the input signal as:

$$F_{NR}(i, j) = \frac{1}{N} \sum_{n=-r}^{r} \sum_{m=-r}^{r} w_{m,n} \cdot F(i+m, j+n),$$

wherein $F_{NR}(i, j)$ is the filtered signal;

$$w_{m,n} = \begin{cases} 2 & \text{if } |F(i+m, j+n) - F(i, j)| < C_1 \sigma_n, \\ 1 & \text{if } |F(i+m, j+n) - F(i, j)| < C_2 \sigma_n, \\ 0 & \text{otherwise;} \end{cases}$$

$$N = \sum_{n=-r}^{r} \sum_{m=-r}^{r} w_{m,n},$$

and $C_1$, $C_2$ are predetermined constants with $0 < C_1 < C_2$, and $\sigma_n$ is the local noise power.

35. The method of claim 30, wherein said smoothing filter comprises a minimal mean square error filter that filters the signal as:

$$F_{NR}(i, j) = \mu(i, j) + \frac{\max(\sigma^2(i, j) - \sigma_n^2, 0)}{\max(\sigma^2(i, j) - \sigma_n^2, 0) + \sigma_n^2} \cdot [F(i, j) - \mu(i, j)],$$

wherein $F_{NR}(i, j)$ is the filtered signal;

$$\mu(i, j) = \frac{1}{r^2} \sum_{n=-r}^{r} \sum_{m=-r}^{r} F(i+m, j+n),$$

$$\sigma(i, j) = \frac{1}{r^2} \sum_{n=-r}^{r} \sum_{m=-r}^{r} |F(i+m, j+n) - \mu(i, j)|,$$

and $\sigma_n$ is the local noise power.

36. The method of claim 30, wherein the step of selecting further includes the steps of selecting the result of the smoothing filter as the output in the filtering region, and selecting the original input signal as the output in the non-filtering region.

37. A method of reducing mosquito noise in decoded video image sequence, comprising:
employing a noise reduction processor for:
performing a gradient computation to determine the magnitude of a gradient in the video image;
classifying the input image into a mosquito noise filtering region and a non-mosquito noise region using the gradient computation;
using the classification information to adaptively remove the mosquito noise from the video image;
generating a filtering region map for a video image;
using a low-pass filter to smooth the filtering region map and generate a smooth transition between a filtering region and a non-filtering region;
estimating a local noise power that estimates the equivalent local additive Gaussian noise power from the video image;
using a smoothing filter to remove unwanted noise from the video image; and
gradually soft switching the smoothing filter on and off based on the smoothed filtering region map to generate an output.

38. The method of claim 37, wherein the step of soft switching further includes determining the output $F_{OUT}(i,j)$ as:

$F_{OUT}(i,j) = \tilde{R}(i,j) \cdot F_{NR}(i,j) + (1 - \tilde{R}(i,j)) \cdot F(i,j)$, wherein $\tilde{R}(i,j)$ is the smoothed filtering region map, $F_{NR}(i,j)$ is the output of the smoothing filter, and F(i,j) is the original input video image.

* * * * *